United States Patent [19]

Biber et al.

[11] Patent Number: 4,482,092
[45] Date of Patent: Nov. 13, 1984

[54] HEATING AND AIR-CONDITIONING INSTALLATION FOR MOTOR VEHICLES

[75] Inventors: Wolfgang Biber, Eutingen im Gäu; Werner Stähle, Sindelfingen; Albert Stolz, Tuebingen, all of Fed. Rep. of Germany

[73] Assignee: Daimler-Benz Aktiengesellschaft, Fed. Rep. of Germany

[21] Appl. No.: 435,962

[22] Filed: Oct. 22, 1982

[30] Foreign Application Priority Data

Oct. 28, 1981 [DE] Fed. Rep. of Germany ....... 3142643

[51] Int. Cl.³ .............................................. G05D 23/00
[52] U.S. Cl. ............................. 237/12.3 B; 236/91 F; 165/16; 165/43
[58] Field of Search ...................... 165/43, 16; 236/13, 236/91 G, 91 F; 237/12.3 B

[56] References Cited

U.S. PATENT DOCUMENTS 4,143,706  3/1979  Schnaibel et al. ............... 165/43 X
4,378,087  3/1983  Sakurai et al. ....................... 236/13

FOREIGN PATENT DOCUMENTS 56-37439  11/1981  Japan ...................................... 165/16

Primary Examiner—William E. Wayner
Assistant Examiner—J. Sollecito
Attorney, Agent, or Firm—Craig & Burns

[57] ABSTRACT

A heating and air-conditioning installation for motor vehicles, in which an adjustable desired temperature is kept constant in the interior space of the motor vehicle independently of changing conditions, includes a heat-exchanger connected to the hot water circulation of the engine as well as an adjusting member on whose position is dependent the heat quantity supplied to the vehicle interior space; the position of the adjusting member is controlled by an output signal produced by an electronic circuit as a function of the sensor detecting the heat quantity supplied to the vehicle interior space, an interior sensor, a setting device and an outside sensor; a switching device operable to switch from fresh-air operation to recirculated-air operation is also controlled as a function of a signal of the electronic circuit; the electronic circuit includes a delay element to produce a time-delayed intermediate signal from the values obtained from the interior sensor, the outside sensor and the setting device; the intermediate signal produces together with the value determined by the sensor detecting the heat quantity supplied to the vehicle interior space, an output signal for the adjusting member; the electronic circuit also produces a signal as a function of the difference between the value detected by the outside sensor and the value determined at the setting device which controls the switching over from fresh-air circulation to recirculated-air operation.

20 Claims, 3 Drawing Figures

HEATING AND AIR-CONDITIONING INSTALLATION FOR MOTOR VEHICLES

BACKGROUND OF THE INVENTION

The present invention relates to a heating and air-conditioning installation for motor vehicles, by means of which an adjustable temperature is kept constant in the interior space of a motor vehicle independent of changing conditions. The installation includes a heat-exchanger that is connected to the hot water circulation system of the engine, as well as with an adjusting member, on the position of which is dependent the heat quantity supplied to the vehicle interior space. The position of the adjusting member is controlled by an output signal produced by an electronic circuit in dependence on a sensing device detecting the heat quantity supplied to the vehicle interior space, on an interior temperature-sensing device (interior sensor), on a setting means for setting the desired value and on an outside temperature-sensing device (outside sensor). A fan and a switching device for switching from fresh-air operation to recirculated-air operation are also controlled in dependence on a signal of the electronic circuit.

It is known in the prior art to control the temperature in the interior space of a motor vehicle with the aid of an electronic circuit which has, inter alia, the task of acting upon an adjusting member that controls the supply of more or less heated air to the vehicle interior space. This control operation takes place in dependence on value which are fed to the electronic circuit from a sensing device detecting the heat quantity supplied to the vehicle interior space, a temperature-sensing device which detects the interior temperature in the vehicle (interior sensor) as well as a temperature value adjustable at a setting means in the interior of the motor vehicle. In a known type of construction the difference between the values of the sensing device detecting the supplied heat quantity and the interior sensor is used as a guide magnitude during this control operation. The control deviation is then formed from the difference of this difference with the desired value.

It has been proved as disadvantageous for small changes in the adjustment of the desired value potentiometer to lead to a sudden response of the heating or air-conditioning system so that pressure and temperature changes in the interior space of the vehicle which also occur suddenly as a result thereof, impair the driving comfort. Additionally, the prior art air-conditioning installation also responds to brief temperature changes in the vehicle interior space, i.e., temperature changes which occur over short periods of time, for example, during a brief opening of the window, which is neither necessary nor desirable. It is already known to detect the temperature on the outside air of the vehicle with the aid of an outside sensing device for influencing the proportionality range of this control cycle, whereby, however, the rapid undesired response in case of small temperature changes in the vehicle interior space can not be completely eliminated.

A further disadvantage of the prior art air-conditioning installation resides in the manner of the switching or shifting from fresh-air to recirculated-air operation. Such a switching will always be undertaken when the evaporator of the air-conditioning installation has reached the limits of its output capacity. This is the case in particular at very high outside temperatures and at the same time at very high relative air humidities, whereby the air-conditioning installation then no longer branches off the air required for cooling from the outside air, but instead is connected with the vehicle interior space by way of a duct so that already pre-cooled air is used for the further cooling. This switching over from fresh-air operation to recirculated-air operation takes place in the prior art air-conditioning systems when the difference between the set or desired value and the instantaneous existing value detected at the interior sensing device is used as guide magnitude for this switching operation. This has a consequence that the installation switches over in regular intervals from fresh-air to recirculated-air and vice-versa, whereby a constant actuation of the shifting mechanism is required. As a result thereof, the pressure as well as the noise conditions also change constantly in the interior space of the vehicle.

SUMMARY OF THE INVENTION

The present invention is concerned with the task of providing an air-conditioning installation which avoids the aforementioned disadvantages and which does not react or reacts only slightly to strong disturbing magnitudes occurring only over a short period of time. Additionally, the shifting back and forth between recirculated air and fresh air is to be precluded.

The present invention includes an electric circuit which has a delay element, by means of which a time-delayed intermediate signal is formed from the values detected by the interior sensing device, the exterior sensing device and the desired value setting means, which intermediate signal, together with the value which is detected by the sensing device sensing the heat quantity supplied to the vehicle interior space, produces an output signal for the adjusting member. By the interposition of a delay element, a brief disturbing magnitude detected at the interior sensing device does not lead immediately to a response of the adjusting element. Depending on the dimensioning of the delay element, the delay time can be so selected that only during a longer presence of a change of the guide magnitude, the adjusting member also follows correspondingly this change. The delay time may amount, for example, to thirty seconds so that a brief window opening does not yet lead to the adjustment of the adjusting member described above. If the electric circuit includes means for the formation of a signal in dependence on the difference between the value detected by the exterior sensing device and the value predetermined at the setting device, whereby the switching over from fresh air to recirculated air operation takes place in dependence of this signal, a guide magnitude is selected thereby for the switching operation between recirculated-air operation and fresh-air operation which is constant over a relatively long period of time because the outside temperature is a relatively constant magnitude and a constant magnitude is also given by the adjustable desired or set value. As a result thereof, the constant switching over from recirculated-air to fresh-air operation is prevented thereby.

It is also advantageous if the delay element consists of two oppositely connected electrolytic condensers and a resistance connected to the input thereof, whereby at the noninterconnected terminals of the condensers, a reference voltage is applied on one side and a signal combined by an adding circuit of the values detected by the interior sensing device, the exterior sensing device and the desired value setting device is applied to the other side. If an input of a voltage follower is connected to the terminal at which exists the added signal, a changed output signal will be obtained at the impedance converter only if an equalization of the voltages at the condenser has taken place. Consequently, a change of the combined signal—interior sensor, exterior sensor and desired-value setting device—leads only slowly to a changed output value of the voltage follower, whereby the full change takes place only if a voltage equalization has taken place at both terminals of similar polarity of the two interconnected electrolytic condensers. The delay can be achieved thereby in a very simple manner.

The output signal of the voltage follower, connected together with the value which is detected by the sensing device detecting the supplied heat quantity, is operatively connected to a terminal of an operational amplifier operating as a summing device. As a result thereof, this sensing value together with the intermediate signal influences the adjusting member without delay in that the output signal of the summing device is utilized for the control of the adjusting member.

The value predetermined at the setting device and the value detected by the exterior sensing device is advantageously combined in an adding circuit and is operatively connected to an input of an operational amplifier connected as summing device. The value detected by the interior sensing device, added to the values of the setting device and of the exterior sensor, may also be connected with slight weighting to the input of the differential amplifier. The weighting thereby takes place preferably at the ratio of about 10:1 between exterior sensing value and interior sensing value as well as at the ratio of about 5:1 between the desired-value setting device and the exterior sensing device. As a result thereof, the difference $(t_a - t_{soll})$ which effects the switching over from fresh-air to recirculated-air operation, may be fixed, for example, at 5° C. with an interior temperature of 25° C. As a result of the influence of the change of the interior space temperature, this switching difference may then be varied so that it is reduced to about 0° C., for example, at an interior temperature $t_i$ of about 50° C.

In one embodiment of the present invention, a water valve is provided as an adjusting member which is arranged in the hot water circulation of the heat-exchanger, and a heat-exchanger sensing device is provided as a sensing device detecting the heat quantity supplied which detects the temperature of the heat-exchanger and produces a signal corresponding thereto which is fed to the electronic circuit. The output signal of the electronic circuit is then used for the control of the water valve whereby if this valve is opened, a large amount of hot water flows through the heat-exchanger which has as a consequence a heating operation. If little water flows through the heat-exchanger, i.e., if the water valve is more or less closed, then the temperature is correspondingly reduced.

In another embodiment of the present invention, a mixing air valve or flap is provided as an adjusting member and a feedback potentiometer is provided as a sensing device detecting the supplied heat quantity, which applies to the electronic circuit a signal corresponding to the position of the mixing air valve. The mixing air valve is thereby so arranged that depending on its position, an air stream conducted through the heat-exchanger is mixed with an air stream not heated by the heat-exchanger. The position of this mixing air valve can be detected by means of a feedback potentiometer, from which conclusions can be drawn as regards the heat quantity supplied to the interior space.

According to a further feature of the present invention, provision may be made to utilize a sensing device for detecting the outside humidity which is also connected with lesser weighting to the input of the summing device. As a result thereof, a difference reduction dependent on the relative outside humidity can be effected thereby, i.e., the higher the relative humidity, the smaller the difference between outside temperature and set or desired value which will lead to a switching over.

The output signal of the summing device is connected to a second operational amplifier connected in the manner of a two-point controller, at the output of which is then produced a signal which is provided for the control of the switching over from fresh-air operation to recirculated-air operation. Thus, for example, the base of a switching transistor can be controlled by means of this signal which is then rendered conductive, respectively, nonconductive and, as a result thereof, opens, respectively, and closes the shifting device. By appropriately dimensioning the second operational amplifier, the switching back from recirculated-air operation to fresh-air operation takes place, for example, at a difference between outside temperature and desired value of about 3° Kelvin with an interior temperature $t_1 = 25°$ C. This produced tolerance temperature prevents small changes of the outside temperature to causing a switching-over. This temperature at which takes place the switching back is thereby also subjected to the influence of the interior space temperature since the latter becomes noticeable at the first summing device.

These and further objects, features and advantages of the present invention will become more apparent from the following description when taken in connection with the accompanying drawing which shows, for purposes of illustration only, two embodiments in accordance with the present invention, and wherein:

DESCRIPTION OF THE PREFERRED EMBODIMENTS

Figure 1:
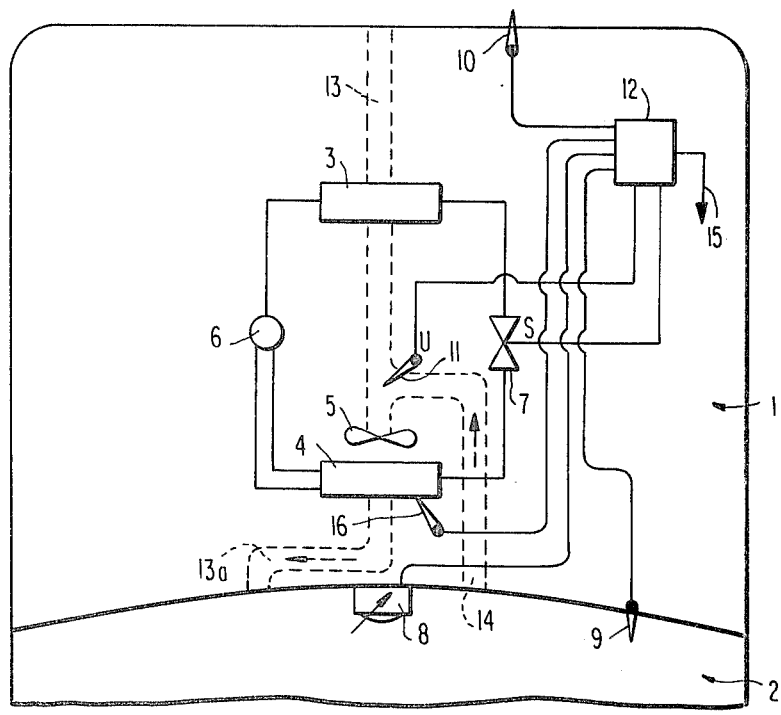
FIG. 1 is a schematic view of the construction of a heating and air-conditioning installation in accordance with the present invention in which a water valve is provided as an adjusting member and a heat-exchanger sensing device is provided as a sensing device detecting the supplied heat quantity.

Referring now to the drawing wherein like reference numerals are used throughout the various views to designate like parts, and more particularly to FIG. 1, the operational parts of a heating and air-conditioning installation which are accommodated in an engine space generally designated by reference numeral 1 serve for maintaining constant the temperature conditions in the interior space generally designated by reference numeral 2 of a motor vehicle illustrated only schematically. A heat-exchanger 4 is connected by way of inflow and return lines to the hot water circulation system of the engine 3. Hot water can be pumped through the heat-exchanger 4 by means of a pump 6; the heat-exchanger 4 is able to take care to a greater or lesser degree, depending on the through-flow quantity, of heating the interior space 2. In order to control the through-flow of the hot water through the heat-exchanger 4, a water valve 7 is interconnected in the embodiment illustrated in FIG. 1 in the return line from the heat-exchanger 4 to the engine 3, which valve is controlled by an electronic circuit 12 and thus determines the through-flow quantity through the heat-exchanger 4. Depending on the temperature of the heat-exchanger 4, the correspondingly heated warm air can then reach the interior space 2 of the vehicle by way of the channel section or duct 13a. The control operation is undertaken as a function of the values detected by an interior sensing device 9, an exterior sensing device 10, a desired-value setting device 8, and a heat-exchanger sensing device 16 which are connected for this purpose to the electronic circuit 12 by conventional elements and circuits, whereby the latter produces a corresponding output signal S for the control of the water valve 7. Additionally, an output signal U for the control of a switching or shifting device 11 is produced in dependence of the aforementioned values, which switching device 11 has the function of connecting the blower 5, depending on the conditions by way of a suction duct 14 for the interior air with the interior space of the vehicle or by way of a suction duct 13 for outside air with the atmospheric air outside the vehicle. Similarly, the blower 5 is controlled at differing heating stages to operate at different speeds by the electronic circuit 12 in a conventional manner not described in detail herein. Furthermore, the electronic circuit 12 may additionally assume the functions that under certain conditions a mode change of the selected heating air inlet takes place from the leg space to the center nozzles in a known manner, for which purpose a control signal is produced that is designated in FIG. 1 by reference numeral 15.

Figure 2:
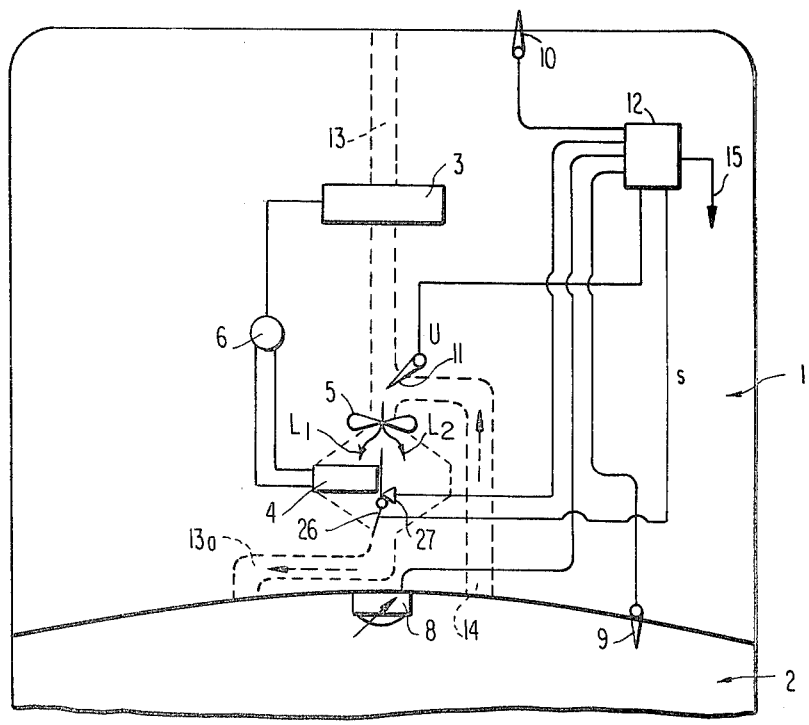
FIG. 2 is a schematic view of the construction of an air-conditioning installation in accordance with the present invention, in which a mixing air valve is provided as an adjusting member and a feedback potentiometer is provided as a sensing device detecting the supplied heat quantity.

FIG. 2 illustrates a preferred embodiment in which a heating and air-conditioning installation is illustrated which operates as an air-mixture regulating installation. The basic construction corresponds to the embodiment illustrated in FIG. 1 and therefore will not be described again herein. However, differing from the first embodiment, the air-mixture regulating air-conditioning installation includes as an adjusting member a mixing-air valve 26 which, depending on the position, mixes an air stream $L_1$ supplied by way of the heat-exchanger, which is thereby heated, with a nonheated air stream $L_2$ that is conducted past the heat-exchanger 4. The temperature of the air stream entering the interior space 2 of the vehicle by way of the channel section 13a can also be varied. Since the temperature is dependent on the position of the mixing air flap 26, a feedback potentiometer 27 may be arranged at the mixing valve 26 as a sensor which enables a determination of the heat quantity supplied to the interior space; the feedback potentiometer 27 thereby produces a signal corresponding to the position of the mixing flap 26 which is fed to the electronic circuit 12. Of course, a water valve may also be provided in this case in the hot water circulatory system which, however, is not illustrated in FIG. 2 for the sake of clarity.

Since the manner of operation of the electronic circuit to be described hereinafter is the same for both embodiments, the same will be described in detail hereinafter by reference to the embodiment illustrated in FIG. 1.

Figure 3:
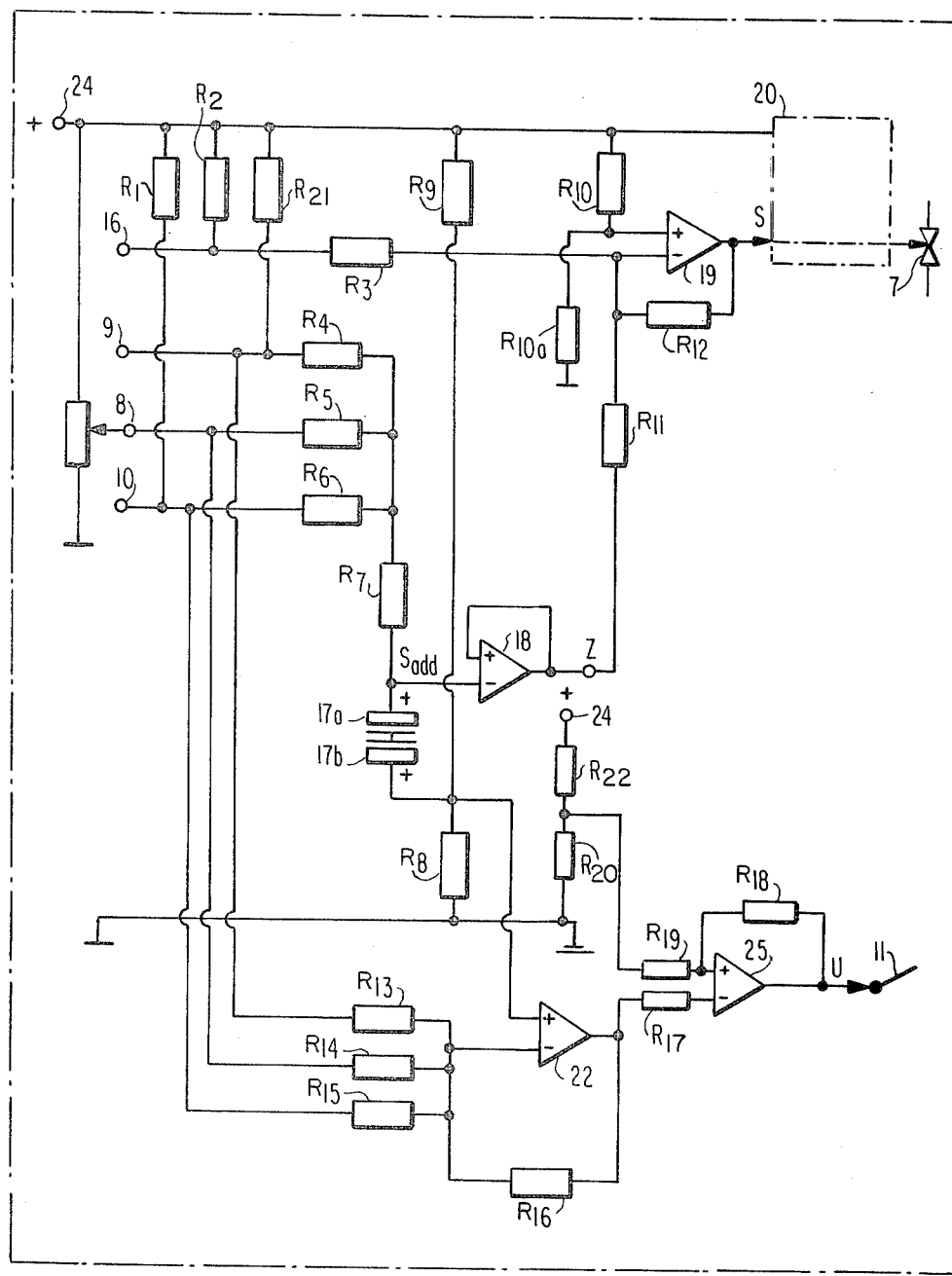
FIG. 3 is a schematic circuit diagram in accordance with the present invention of the circuit elements for the control of the adjusting member and of the switching device for selectively switching between fresh-air and recirculated-air.

In FIG. 3, the elements interconnected according to the present invention for the control of the water valve 7 and for the switching or shifting device 11 are indicated only for illustrative purpose, whereby the remaining functions such as, for example, the switching from the leg space nozzles to the center nozzles or the stepwise increase in speed of the blower 5, are taken over in a known manner by the circuit unit 20 not shown in detail since it merely utilizes conventional circuitry. The input lines of the exterior sensor 10, the interior sensor 9 as well as the heat-exchanger sensor 16 are connected to the voltage source 24 by way of the resistances $R_1$, $R_2$ and $R_{21}$. A potentiometer is also connected with the voltage source whose tap can be adjusted in the interior space of the vehicle so that the same serves as desired-value setting device 8. The value of the exterior sensor 10 and of the interior sensor 9 as well as the value adjusted at the desired value setting device 8 are added in a summing circuit by way of the resistances $R_4$, $R_5$ and $R_6$ and are connected as added signal $S_{add}$ by way of the resistance $R_7$ to one terminal of an electrolytic condenser 17a which, with its other terminal is connected to the terminal of same polarity of a second electrolytic condenser 17b. The not-yet-mentioned terminal of same polarity (plus polarity) of the electrolytic condenser 17b is supplied with a constant voltage by way of a voltage divider $R_8$ and $R_9$. To that terminal of the electrolytic condenser 17a, at which exists the added signal $S_{add}$, is also connected an input of an operational amplifier connected as voltage follower 18, at the output of which is then produced an intermediate signal Z, which is transmitted by way of the resistance $R_{11}$ and is connected to the input of an operational amplifier 19 connected as a summing device with the aid of the resistance $R_{12}$, whereby the value detected by the heat-exchanger sensor 16 is applied to the same input by way of the resistance $R_3$. Hence, a second addition takes place as a result thereof, namely, the addition of the intermediate signal Z with the value detected at the heat-exchanger. The noninverting input of the operational amplifier 19 is also supplied with a constant voltage from the voltage source 24 by way of a voltage divider formed by the resistances $R_{10}$ and $R_{10a}$. The signal for the control of the water valve 7 then exists at the output of the operational amplifier 19. The part of the circuit so far described operates as a control device, the operation of which is described below.

The guide or control magnitude is formed by the difference of the value set at the desired-value setting device 8 to the temperature detected at the interior sensor 9. For that purpose, the resistances $R_4$ and $R_5$ are weighted equally, whereby in connection with the selection of the resistance $R_5$, one must additionally take into consideration that the signal can change very quickly in the output of the potentiometer serving as setting device 8 so that for purposes of producing the necessary flatness, the resistance $R_5$ must be selected larger than the resistance $R_4$. The resistance $R_6$ which is connected in the line of the exterior sensor 10 is selected larger so that a lesser weighting of the value detected by the exterior sensor is achieved thereby. If the detected temperature of the interior sensor and of the exterior sensor now remains constant and if also the setting device 8 is not changed, then a constant signal exists as intermediate signal Z since the electrolytic condensers have become charged and thus are equalized. If, for example, the desired-value setting device 8 is now changed, i.e., a different temperature is desired in the interior space of the vehicle, then the delay element constituted by the electrolytic condensers 17a and 17b and the resistance $R_7$ effects that by reason of the produced potential difference a charging operation now takes place which brings about a delay of the added signal. The full change of the intermediate signal Z therefore exists only time-delayed by the charging time of the condensers 17a and 17b. As a result thereof, a change of one of the magnitudes of the interior sensor, the exterior sensor or the setting device acts on the water valve only with time delay. By reason of the interconnection of such a delay element, a disturbing magnitude which occurs only for a short period of time, for example, a brief window opening which will become noticeable at the interior sensor 9, will not lead to an immediate actuation of the water valve 7 so that as a result thereof, an altogether more continuous control is achieved which increases the comfort. The temperature detected at the heat-exchanger sensor 16 is added to the intermediate signal Z without time delay and is utilized by way of the operational amplifier 19 as feedback for the formation of the output signal S for the position of the water valve 7.

For the control of the shifting or switching valve 11 from fresh-air to recirculated-air operation and vice-versa, an adding circuit of the value predetermined at the setting device 8 and the value detected at the exterior sensor 10 is also provided in accordance with the present invention.

As can be seen from FIG. 3, the temperature existing at the interior sensor 9 is also additionally taken into consideration in connection with this adding circuit whereby, however, such an influence on the respective proportion of the signals is undertaken by way of the weighting of the resistances $R_{13}$, $R_{14}$ and $R_{15}$ such that the difference of the outside temperature $t_a$ minus the temperature $t_{soll}$ adjusted at the setting device serves as a guide or control magnitude. This is achieved in that the resistance $R_{13}$ is selected, for example, larger by a factor of 10 than the resistance $R_{15}$ and about twice as large as the resistance $R_{14}$. By the selection of such a guide magnitude which is constant over a relatively long period of time—the outside temperature does not change suddenly and the desired value once set is maintained—it becomes possible to keep the switching device 11 in one position over a relatively long period of time so that a continuous to-and-fro shifting is not necessary in order to be able to achieve the constant interior space temperatures. The added signal from the interior sensor value, exterior sensor value and the setting device value is compared by way of an operational amplifier 22 operating as summing device which includes a coupling resistance $R_{16}$, with a reference voltage and is fed by way of a resistance $R_{17}$ to a second operational amplifier 25 which is used as two-point controller of this signal for the control of the shifting device 11. The noninverting input of this differential amplifier 25 is supplied with a reference voltage by way of the voltage divider $R_{22}$ and $R_{20}$ as well as the input resistance $R_{19}$. The resistance $R_{18}$ serves as feedback resistance. Such a circuit can be so dimensioned that the difference between the outside temperature $t_a$ and the desired value temperature $t_{soll}$ which brings about the switching from fresh-air to recirculated-air, amounts, for example, to 5° C. with an interior temperature $t_i$ of 25° C. With an increasing interior temperature, this difference decreases so that it decreases, for example, to about 0° C. at an interior space temperature $t_i$ of about 50° C.

However, it is also feasible within the scope of the present invention to make the described difference reduction additionally or exclusively dependent on the relative outside humidity, which, however, is not shown in FIG. 3, but which may be realized in a similar manner due to the influence of the interior space temperature. Such an influencing offers the advantage that an influencing magnitude is selected thereby which is related directly to the degree of efficiency of the evaporator since the evaporator reaches rapidly the limits of its output capacity at high air humidities which can then be taken into consideration by a corresponding switching to recirculated-air operation.

The switching back from recirculated-air operation to fresh-air operation is so constructed that it takes place with a temperature of $t_i = 25°$ C. at a temperature difference $t_a - t_{soll}$ of about 3° Kelvin, whereby a buffer zone results between the switching difference from fresh-air operation to recirculated-air operation and the switching difference from recirculated-air operation to fresh-air operation so that even with slight changes of the outside temperatures, this does not lead to a switching back from recirculated-air to fresh-air operation.

A more comfortable heating and air-conditioning system which is reliable in its functioning is achieved altogether by the measures described hereinabove than was the case heretofore.

It is understood that the heat-exchanger element shown in block diagram not only contains a heat-exchanger connected with the engine cooling circulatory system, but also includes those parts of an air-conditioning system necessary to cool the air passing therethrough. Since these parts of the air-conditioning system are of conventional construction, they are not shown in connection with the heat-exchanger element 4 for the sake of simplicity.

While we have shown and described only two embodiments in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A heating and air-conditioning installation for motor vehicles, by means of which an adjustable temperature is kept substantially constant in the interior space of a motor vehicle independent of changing conditions, comprising heat-exchanger means operatively connected with a hot water circulatory system of the engine, adjusting means on the position of which is dependent the heat quantity supplied to the vehicle interior space, electronic control circuit means, sensor means for detecting the heat quantity supplied to the vehicle interior space, interior sensor means for detecting the interior temperature, setting means for setting a desired value, outside sensor means for detecting the outside temperature, the position of the adjusting means being controlled by way of an output signal produced by said electronic circuit means as a function of the sensor means sensing the heat quantity supplied to the vehicle interior space, the interior sensor means, the setting means and the outside sensor means, and switching means for switching from fresh-air operation to recirculated-air operation controlled in dependence on a signal of the electronic circuit means, the electronic circuit means including means for forming a signal in dependence on the difference between the value detected by the outside sensor means and the value predetermined at the setting means, the switching from fresh-air operation to recirculated-air operation taking place as a function of said signal.

2. A heating and air-conditioning installation according to claim 1, characterized in that the value adapted to be predetermined at the setting means and the value detected by the outside sensor means, combined in an adding circuit means, are operatively connected to an input of a first operational amplifier means connected as summing device.

3. A heating and air-conditioning installation according to claim 2, characterized in that the value detected by the interior sensor means is also operatively connected with lesser weighting to the input of the first operational amplifier means.

4. A heating and air-conditioning installation according to claim 3, characterized in that a weighting in the ratio of about 10:1 is provided in the adding circuit means between outside sensor value and interior sensor value as well as a ratio of about 5:1 between setting means value and outside sensor value.

5. A heating and air-conditioning installation according to claim 3, characterized in that a sensor means for detecting the outside humidity is provided which is also operatively connected with lesser weighting to the input of the first operational amplifier means.

6. A heating and air-conditioning installation according to claim 2, characterized in that the output signal of the first operational amplifier means is operatively connected to a second operational amplifier means connected as a two-point controller.

7. A heating and air-conditioning installation according to claim 6, characterized in that the output signal of the second operational amplifier means is used for the control of the switching means from fresh-air operation to recirculated-air operation.

8. A heating and air-conditioning installation according to claim 1, characterized in that the electronic circuit means includes a delay means, operable to form a time-delayed intermediate signal from the values detected by the interior sensor means, the outside sensor means and the setting means, and further means for producing from said intermediate signal together with the value detected by the sensor means detecting the heat quantity supplied to the vehicle interior space, an output signal for the adjusting means.

9. A heating and air-conditioning installation according to claim 8, characterized in that the delay means includes two mutually oppositely connected electrolytic condenser means and a resistance connected to the input thereof, a reference voltage being applied to one of the noninterconnected terminals of the condenser means and a signal combined by an adding circuit means of the values detected by the interior sensor means, the outside sensor means and the setting means being applied to the other noninterconnected terminal.

10. A heating and air-conditioning installation according to claim 9, characterized in that an operational amplifier means connected as voltage follower is operatively connected to the terminal of the electrolytic condenser means to which is applied the added signal.

11. A heating and air-conditioning installation according to claim 10, characterized in that the output signal of the voltage follower, combined with the value which is detected by the sensor means detecting the supplied heat quantity, is operatively connected to a terminal of an operational amplifier means operating as summing means.

12. A heating and air-conditioning installation according to claim 11, characterized in that the output signal of the summing means is used for the control of the adjusting means.

13. A heating and air-conditioning installation according to claim 12, characterized in that a water valve which is arranged in the water circulation of the heat-exchanger means, is provided as adjusting means, and in that a heat-exchanger sensor means is provided as sensor means detecting the supplied heat quantity which detects the temperature of the heat-exchanger means and supplies a signal corresponding to said temperature to the electronic circuit means.

14. A heating and air-conditioning installation according to claim 12, characterized in that a mixing air valve is provided as adjusting means and a feedback potentiometer is provided as sensor means detecting the supplied heat quantity which detects the position of the mixing air valve and applies a signal corresponding to this position to the electronic circuit means.

15. A heating and air-conditioning installation according to claim 7, characterized in that the value detected by the interior sensor means is also operatively connected with lesser weighting to the input of the first operational amplifier means.

16. A heating and air-conditioning installation according to claim 15, characterized in that a weighting in the ratio of about 10:1 is provided in the adding circuit means between outside sensor value and interior sensor value as well as a ratio of about 5:1 between setting means value and outside sensor value.

17. A heating and air-conditioning installation according to claim 15, characterized in that a sensor means for detecting the outside humidity is provided which is also operatively connected with lesser weighting to the input of the first operational amplifier means.

18. A heating and air-conditioning installation according to claim 8, characterized in that a water valve which is arranged in the water circulation of the heat-exchanger means, is provided as adjusting means, and in that a heat-exchanger sensor means is provided as sensor means detecting the supplied heat quantity which detects the temperature of the heat-exchanger means and supplies a signal corresponding to said temperature to the electronic circuit means.

19. A heating and air-conditioning installation according to claim 8, characterized in that a mixing air valve is provided as adjusting means and a feedback potentiometer is provided as sensor means detecting the supplied heat quantity which detects the position of the mixing air valve and applies a signal corresponding to this position to the electronic circuit means.

20. A heating and air-conditioning installation according to claim 2, characterized in that a sensor means for detecting the outside humidity is provided which is also operatively connected with lesser weighting to the input of the first operational amplifier means.

* * * * *